Dec. 22, 1964 H. INGOLD 3,162,144
ARRANGEMENT FOR STORING OBJECTS IN MOVABLE RECEPTACLES
Filed March 12, 1963 2 Sheets-Sheet 1
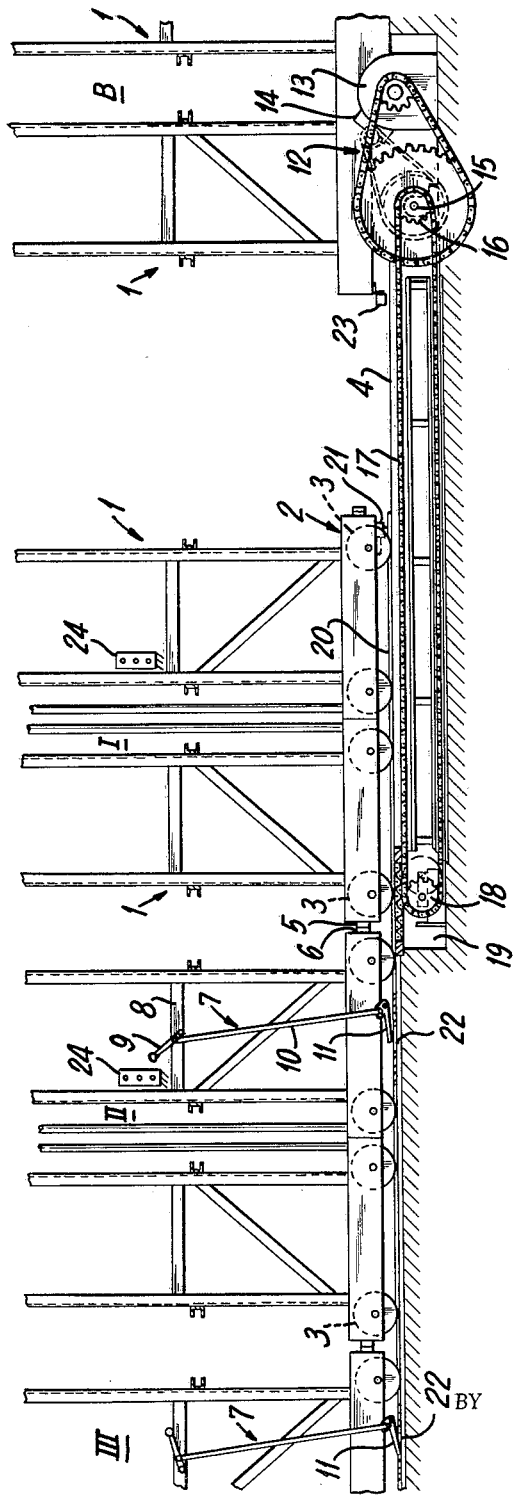
FIG. I
INVENTOR.
HANS INGOLD
BY McGlew & Toren
ATTORNEYS.

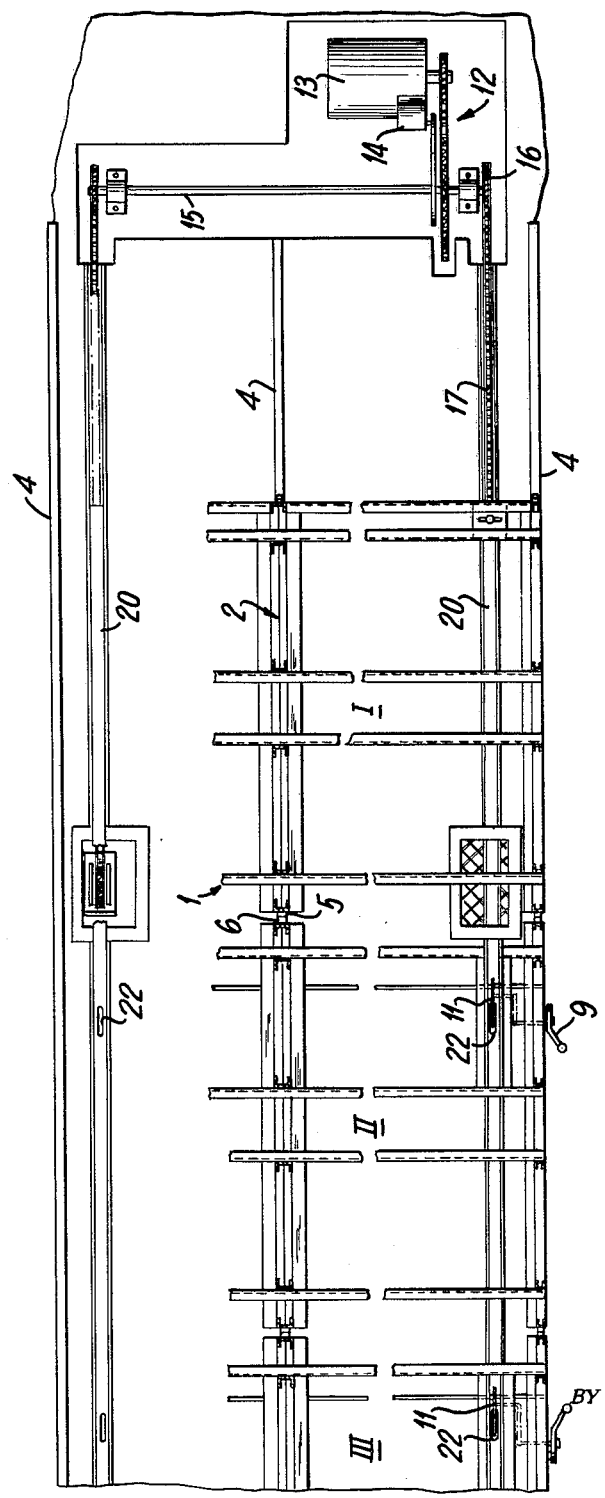

United States Patent Office 3,162,144
Patented Dec. 22, 1964

3,162,144
ARRANGEMENT FOR STORING OBJECTS IN MOVABLE RECEPTACLES
Hans Ingold, Seefeldstrasse 224, Zurich 8, Switzerland
Filed Mar. 12, 1963, Ser. No. 264,541
4 Claims. (Cl. 104—162)

This invention relates to storage receptacles which are shiftable longitudinally of a predetermined path and, more particularly, to a novel and improved shifting mechanism for such storage receptacles.

There are known arrangements for storing objects in a plurality of receptacles displaceable longitudinally of a predetermined path, and with the receptacles being selectively displaceable, relative to each other, to an extent equal to the length of one receptacle along such path to provide a passage between receptacles. Such displacement is generally effected by means of a reversible electric motor driving an endless chain extending along the path. This chain is connected to the displaceable receptacle nearest to the motor so that this receptacle can be displaced in either direction longitudinally of the path. The effective length of the chain, or the length of the chain run, is at least equal to the extent of the desired displacement. To open an operating passage between receptacles positioned along the path, those receptacles to one side of the passage are coupled with each other and moved by the first receptacle which is attached to the chain. The receptacle on the other side of the passage remains in position.

It has been found that, in the case of heavy loads mounted on the receptacles, the chain may become overstressed and damaged. The reason for this is that the chain is stressed in an irregular fashion during the pulling of the coupled receptacles, as each receptacle is "picked up" by the first receptacle. An endless chain having a run length sufficient to extend underneath all the receptacles cannot be used, in practice, due to the difficulties of accurate coupling caused by elasticity and elongation of the chain, and due to the intermittent loading.

Some of the difficulties encountered with a chain can be overcome by using an elongated shifting element or rod, as such a rod can be accurately coupled to the receptacles. However, in practice there are factors which mitigate against the use of such a rod because, with the operating passage open, the rod would have to extend beyond a motor arranged at an end of a plant into the free space outside the plant. This, in turn, requires either unduly great space requirements or special constructional measures to cover the extended rod.

An object of the present invention is to avoid the disadvantages both of the known types of chain drives and of the use of a shifting element or rod.

In accordance with the present invention, an endless chain is provided which has a length of run at least equal to the desired extent of displacement, and this endless chain is driven by a reversible motor. At least one longitudinally movable shifting element or rod is provided, and is shiftable in a direction parallel to a run of the chain. This relatively elongated and rigid shifting element is connected to the chain so that it may be reciprocated in accordance with the reverse directions of the chain movement. The shifting rod has its end nearest to the chain driving mechanism connected to the shiftable receptacle nearest such driving mechanism, and the shifting rod extends through the length of the entire series of receptacles. Each of the other shiftable receptacles has an individual coupling element by means of which each receptacle can be selectively coupled to the shifting rod.

By the use of the endless chain, having a run length at least equal to the desired extent of displacement, in association with a rigid shifting element which is connected to the chain, and thus may be shifted a distance only equal to the extent of desired displacement, the disadvantages both of the formerly used chain drive and of a shifting rod are avoided.

For an understanding of the principles of the invention, reference is made to the following description of a typical embodiment thereof as illustrated in the accompanying drawings.

In the drawings:
FIG. 1 is a side elevation view, partly in section, of a plant equipped with a series of shiftable receptacles; and
FIG. 2 is a top plan view of the arrangement shown in FIG. 1.

Referring to the drawings, a series of receptacles for storing heavy objects such as machine parts, motors, etc., are illustrated at I through III. Each of the shiftable receptacles, which are arranged in series along a substantially rectilinear path, comprises a pair of storage racks 1 mounted on a carriage or truck 2. The racks 1 are accessible from either side of the respective receptacle to receive the objects to be stored. Carriages or trucks 2 are supported on wheels 3 which are guided on rails 4 mounted on the floor of the plant. Depending upon the length of the racks 1 (or the width of the receptacles I through III), as well as on the type of objects to be stored, two or more rails 4 are provided. A fixedly positioned receptacle B, likewise provided with a pair of racks 1, is preferably positioned above the driving mechanism for shifting the receptacles.

Each of the carriages or trucks 2 of the receptacles I–III is provided with a buffer 5 at one end and a buffer 6 at the other end, whereby the buffers 5 and 6 of adjacent receptacles may interengage to maintain the receptacles in spaced relation to each other along the path. With the exception of the receptacle I nearest to the driving mechanism, each of the other shiftable receptacles, such as II and III, is provided with a coupling element 7 which is selectively operable. Each coupling element 7 comprises a handle 9 rotatably or pivotally mounted on a cross bar 8 of a rack 1. Each handle 9 has the upper end of a relatively elongated bar 10 pivotally connected thereto, and the lower end of each bar 10 is connected to one arm of a respective angle lever or bell crank 11 which is pivotally mounted adjacent its vertex. By turning of the handle 9, the bell crank 11 is turned through the connecting link 10 and thus can selectively establish a coupling in a manner to be described. Each receptacle is further provided with a set of electrical controls indicated at 24, and these controls operate the mechanism for the shifting of the receptacles.

At a distance from the receptacble I, and preferably beneath the receptacle B, there is mounted a driving mechanism generally indicated at 12. Mechanism 12 comprises a reversible electric motor 13 provided with a reversing control 14 and driving a reduction gearing including a transverse shaft 15. The output shaft 15 has sprockets 16 secured at either end, and endless chains 17 are trained over these sprockets. Chains 17 extend through the width of the operating passage which is illustrated as extending between the receptacle B and the receptacle I. The chains 17 further extend through the length of the receptacle I and, at their ends remote from the sprockets 16, are trained over sprockets 18 which are placed under tension to maintain the chains taut. Chains 17 are positioned in recesses 19 in the floor so that the upper runs of the chains are slightly beneath the level of the rails 4. With the illustrated arrangement, the tension sprockets 18 are accessible for inspection, maintenance, or adjustment when receptacle I is moved to the right toward receptacle B.

A shifting rod 20 is disposed above the upper run of each endless chain 17 and extends under the series of receptacles such as I, II, III, etc. The right-hand end of each shifting rod 20 is connected to the upper run of a chain 17, and each rod 20 is further connected, through a follower 21, to the truck or carriage 2 of the receptacle I. Each rod 20 is guided in a guide means or groove along which the upper run of each chain extends, and the length of each rod 20 is such that it will extend to the bell crank 11 of the receptacle most remote from the drive mechanism 12. Beneath each receptacle except receptacle I, each rod 20 is formed with a notch or opening 22 which is engageable by the free arm of a bell crank 11.

The arrangement illustrated operates in the following manner: When an operating passage is to be opened between the receptacles I and II, from the position of the receptacles shown in FIG. 1, none of the coupling mechanisms 7 are operated. The driving mechanism 12 is energized in a direction to move the upper run of the chain 17 to the right. Receptacle I is thus moved to the right by its connection to shifting rod 20 which is connected to the upper run of chain 17. Such movement continues until follower 21 abuts an operator 23 which controls switches deenergizing the motor 13. The passage formerly existing between the receptacle I and the receptacle B is now closed and a passage has been opened between the receptacles I and II. In this new position of the receptacles, the right-hand end of shifting rod 20 extends only a very short distance beyond the "safety bar" or switch operator 23.

If an operating passage is to be opened between two other receptacles, such as between receptacles III and a further receptacle to the left of receptacle III, the coupling means 7 of receptacle III is operated to connect this receptacle to shifting rod 20, whereby the free arm of bell crank 11 of receptacle III will be engaged in coupling notch 22 of the shifting rod 20. When motor 13 is now energized, shifting rod 20 will move receptacle I to the right, since this is more or less permanently connected with shifting rod 20, and will also move receptacle III to the right. Such movement of receptacle III will move receptacle II to the right through engagement of the buffers 5, 6 of receptacles II and III. Thereby, a passage is opened to the left of receptacle III.

When this newly opened passage is to be closed, motor 13 is energized to move the upper run of chain 17 and shifting rod 20 to the left. Due to the more or less permanent connection of receptacle I to the shifting rod, receptacle I is moved to the left and, by abutting against receptacle II, and by means of receptacle II abutting against receptacle III, the receptacles are all moved to the left until receptacle III abuts the remote receptacle, such as the receptacle to the left of receptacle III. There is no intermittent pickup of receptacles by the chain, since all movements are effected by the receptacle I.

To block off the entire passage, when necessary, all of the receptacles I–III are moved toward receptacle B. In this latter case, only those racks 1 at the front and rear of the series are accessible.

To obtain exact parallel guidance of the several receptacles, each receptacle may be provided with a coupling element 7 on each side, and both shifting rods 20 may have transversely aligned coupling notches 22. Preferably, both coupling elements of each receptacle are positively connected with each other for conjoint operation.

If necessary or desired, the fixed receptacle B can be positioned to the left of the driving mechanism instead of above the driving mechanism, while still being a stationary receptacle. In this instance, chains 17 must have a run equal to the width of the fixed receptacle B plus the width of the desired operating passage and preferably plus the length of the first shiftable receptacle so that tension sprockets 18 may be accessible for adjustment and maintenance.

While a specific embodiment of the invention has been shown and described in detail to illustrate the application of the principles of the invention, it will be understood that the invention may be embodied otherwise without departing from such principles.

What is claimed is:

1. An arrangement for storing objects in movable receptacles, comprising, in combination, a plurality of movably mounted receptacles juxtaposed along a substantially rectilinear path, said receptacles being selectively relatively displaceable along said path to open a passage between adjacent receptacles; at least one endless chain extending along said path and having parallel runs each of a length at least equal to the desired passage width; reversible driving mechanism operatively connected to said chain; a single relatively elongated substantially rigid shifting rod associated with each chain and extending along one run of the associated chain, and along said path through substantially the conjoint length of the juxtaposed receptacles; means connecting the end of each rod nearest said mechanism to the associated chain; means connecting each rod to one receptacle nearest said mechanism; and coupling means on each of the other receptacles selectively operable to connect the respective other receptacles to each shifting rod.

2. An arrangement for storing objects in movable receptacles, as claimed in claim 1, in which the length of the chain run is equal to the width of the desired passage plus the length, along the path, of said one receptacle.

3. An arrangement for storing objects in movable receptacles, as claimed in claim 1, in which said last-named connecting means connects that end of said one receptacle nearest said mechanism to each shifting rod.

4. An arrangement for storing objects in movable receptacles, as claimed in claim 1, in which said shifting element is formed with an aperture adjacent each respective coupling means; each coupling means including a coupling element selectively engageable in the associated aperture in the shifting element.

References Cited by the Examiner

UNITED STATES PATENTS

| 1,766,225 | 6/30 | Moon | 104—172 |
| 2,642,006 | 6/53 | Merritt et al. | 104—172 |
| 2,772,639 | 11/56 | Ingold | 104—202 |
| 3,055,313 | 9/62 | Stroll et al. | 104—162 |

OTHER REFERENCES

International Combustion Ltd., 487,900, Great Britain.

LEO QUACKENBUSH, *Primary Examiner.*